Feb. 23, 1954  F. G. BREYER ET AL  2,670,196
HIGH TEMPERATURE VAPORIZATION APPARATUS
Filed March 17, 1950  3 Sheets-Sheet 1

INVENTORS
FRANK G. BREYER
ANDRE DELRUELLE
BY
Hammond Cottell
ATTORNEYS

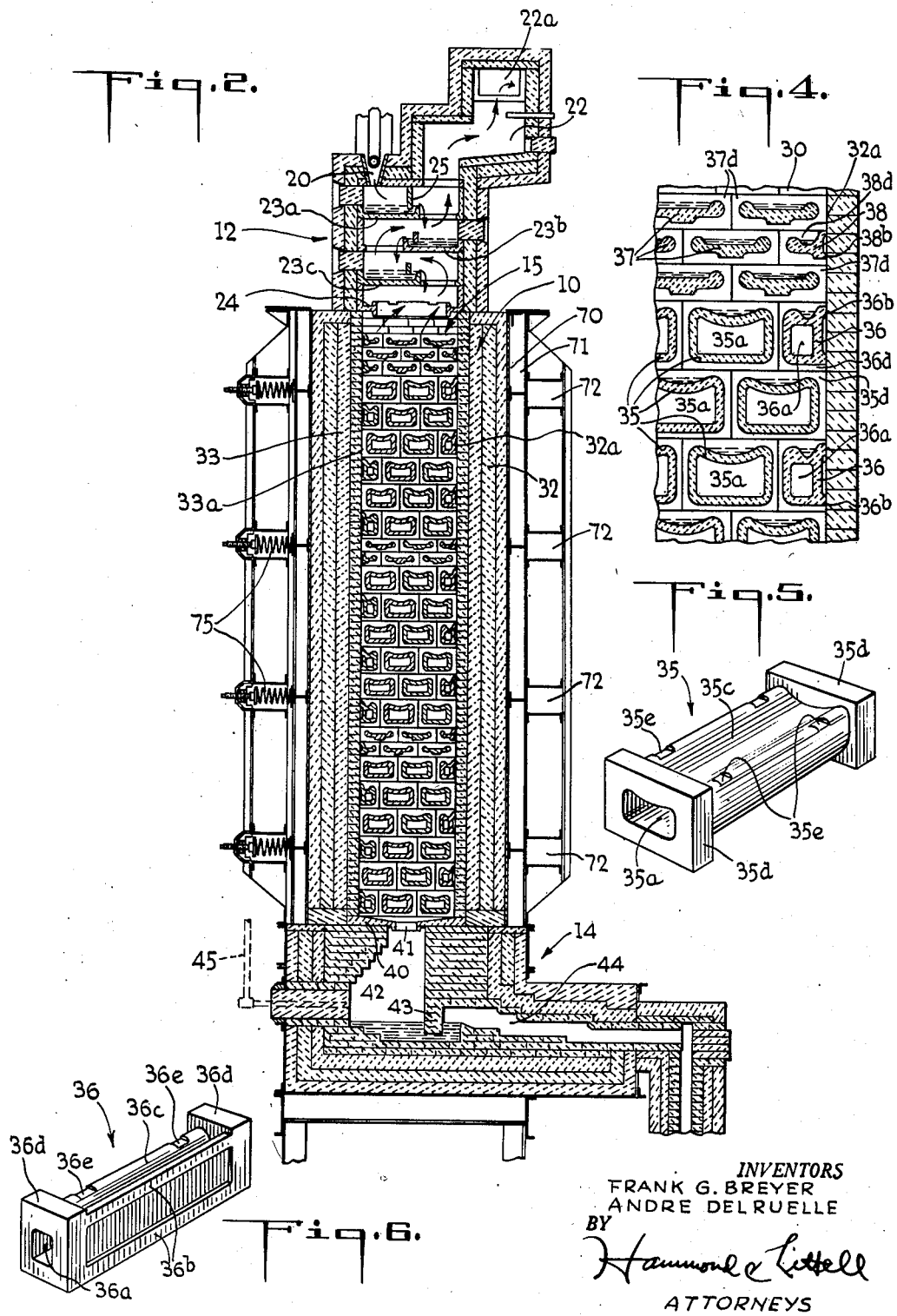

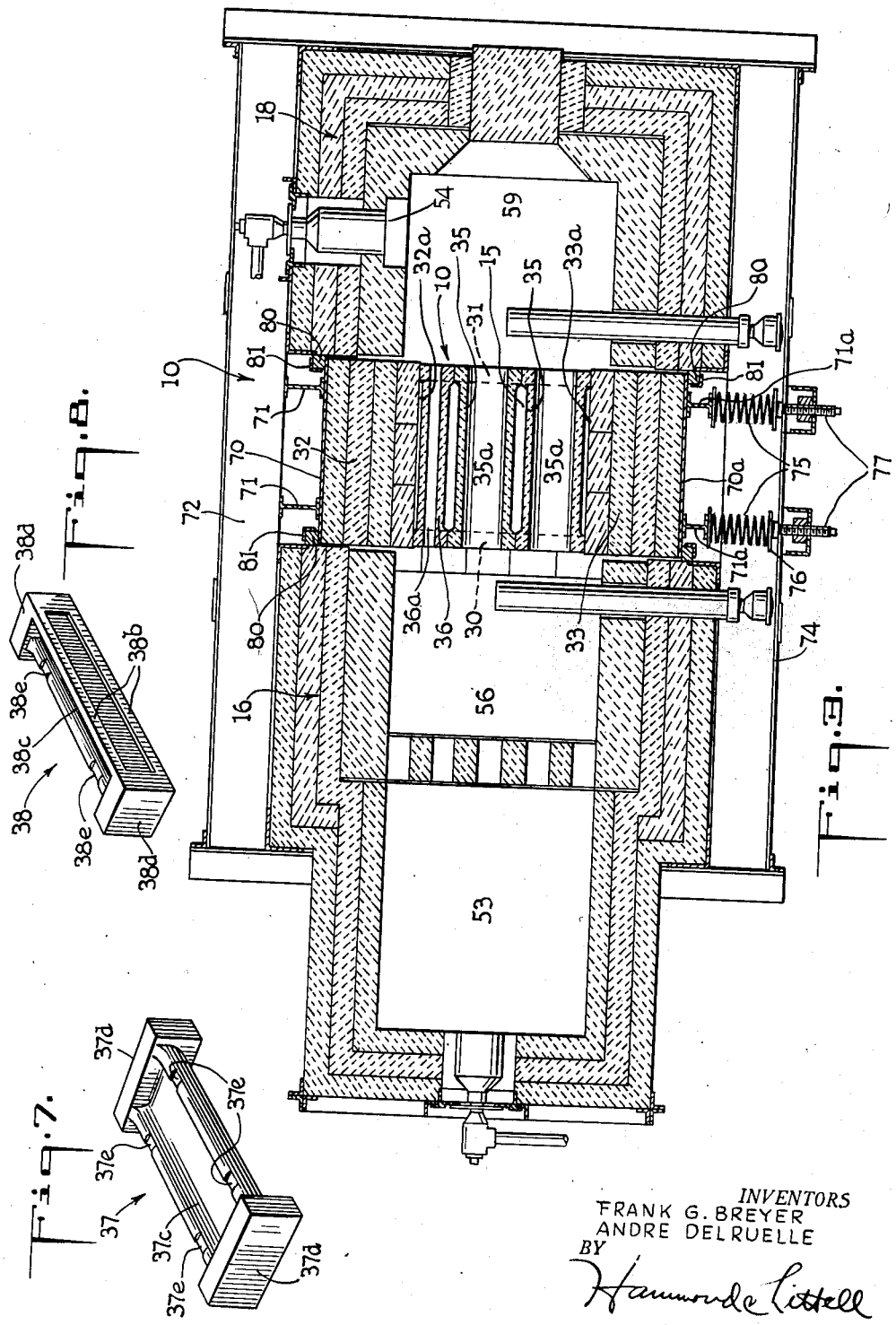

Patented Feb. 23, 1954

2,670,196

UNITED STATES PATENT OFFICE 2,670,196

HIGH TEMPERATURE VAPORIZATION APPARATUS

Frank G. Breyer, Wilton, Conn., and Andre Delruelle, Trooz, Belgium; Marthe C. H. V. Delruelle, lawful heir of said Andre Delruelle, deceased, assignors to Singmaster & Breyer, a copartnership Application March 17, 1950, Serial No. 150,118

2 Claims. (Cl. 266—25)

This invention relates to a new and improved vaporization apparatus of columnar form for continuously treating or purifying molten metals or other heavy or corrosive liquids.

The invention relates also to new arrangements and new elements for the construction of high temperature vaporization columns or vertical retorts; and it provides, more particularly, an efficient pyrometallurgical apparatus especially suited for the continuous refining of metals such as zinc.

One object of this invention is to provide an apparatus of the nature mentioned whereby a continuously inflowing molten metal or other heavy or corrosive liquid that vaporizes at a high temperature may be subjected, in contact with refractory structures that resist the temperature and the corrosiveness of the liquid, and yet with a high degree of heating efficiency, to successive partial vaporizations and to intimate scrubbing or stripping action by vapors or other gases.

Another object is to provide such an apparatus in which the liquid is distributed widely over refractory elements that provide a large area of heat-transferring surface per unit of space, through which heat is conducted to the liquid from hot gases passed through the elements between heating chambers at opposite sides of a vaporization chamber containing the elements, so that a large vaporizing or refining capacity may be obtained with an apparatus of practicable size.

Another object is to provide such an apparatus in which refractory elements holding shallow pools of the liquid are formed and arranged so that extraordinarily heavy weight loads, or large volumes of dense liquid, may be processed satisfactorily in the apparatus.

Still another object is to provide an apparatus of the nature mentioned which can be constructed in an economical and practical manner so as to provide a columnar chamber which has its internal space sealed off or isolated from the external atmosphere, yet which can expand and contract freely under the influence of wide temperature changes without being fractured or admitting harmful gases into the sealed space.

According to one feature of this invention, a columnar chamber made of suitable refractory materials is provided to receive a continuous inflow of the molten metal or other liquid to be treated, and this chamber is filled with a multiplicity of refractory elements which are formed as shallow basins at their upper faces and are spaced from each other and arranged in tiers with elements of adjacent tiers overlapping, so that liquids overflowing the basins will cascade from tier to tier and will intimately contact vapors or gases passing through the spaces between the basin elements. While the many basin elements distribute the liquid widely over the chamber space and produce intimate vapor-liquid contact therein, most of them also are heated internally so that they serve also as heating elements to bring about partial vaporization and hence purification of the shallow pools and thin cascades of liquid exposed to their surfaces.

For the latter purpose many of the basin elements may be made with a hollow or tubular form to provide internal passages for heating gases which are isolated from the vaporization chamber space by relatively thin refractory walls through which efficient transference of heat may be obtained. These elements preferably extend rectilinearly across that chamber space in spaced parallel relation, with their ends opening through opposite side walls of the vaporization chamber into chambers for heating gases at the outsides of those walls.

According to another feature of this invention, the opposite ends of the refractory basin elements, in a structure of the kind described are formed as transverse refractory blocks of suitable shape which are simply stacked and sealed or mortared together in order to build two opposite side walls of the vaporization chamber and at the same time to arrange and support the basin elements across the chamber.

According to still another feature of this invention, a columnar chamber especially suitable for purposes above mentioned may be constructed with abutting pairs of spaced parallel refractory side walls so arranged that the walls of one pair extend across the space between and overlap the longitudinal edges of the other walls, the several walls being kept sealed together yet readily expansible and contractable in any direction by yieldably compressing the overlapping walls against the butting edges of the others between them. An arrangement of fixed frames, horizontally movable overlapping walls and compression springs between one of the frames and one of such walls may be used to advantage for this purpose.

The foregoing and other objects, features and advantages of this invention will become apparent from the following detailed description and the accompanying illustrative drawings of a preferred embodiment, while the distinguishing features of the invention will be defined particularly in the appended claims.

In the drawings:

Fig. 2 is a transverse vertical cross section through the same apparatus, taken approximately at line 2—2 of Fig. 1.

Fig. 3 is a horizontal cross section taken approximately at line 3—3 of Fig. 1.

Fig. 4 is an enlarged fragmentary view, in transverse vertical cross section, of part of the vaporization chamber structures.

Fig. 5 and Fig. 6 are perspective views of two forms of the tubular basin elements used in construction of the vaporization chamber; and Figs. 7 and 8 are perspective views of two forms of unheated or non-tubular basin elements so used.

Figure 1:
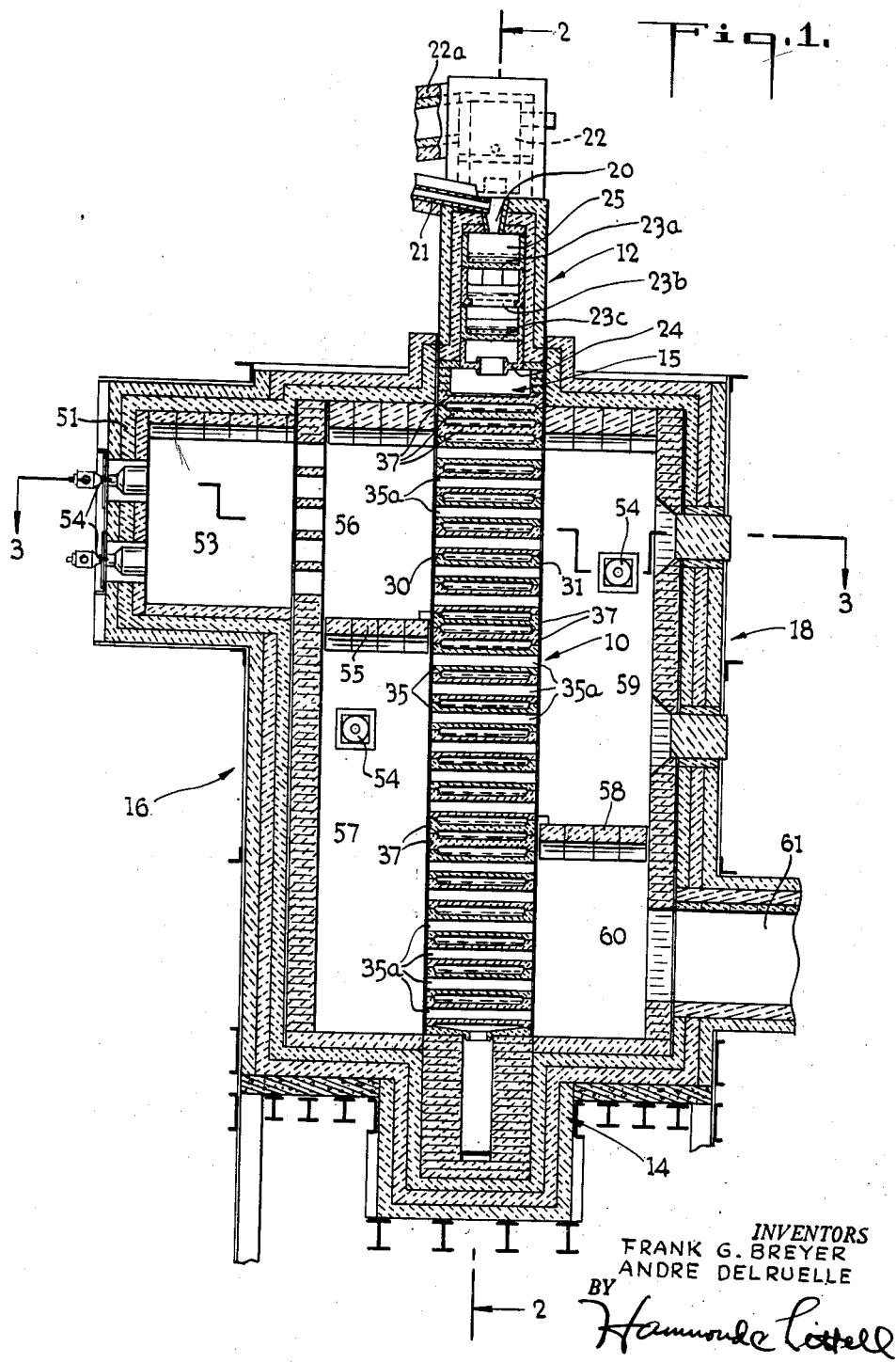
Fig. 1 is a vertical cross section through a vaporization apparatus embodying the invention, as adapted for the removal from molten zinc or cadmium or other constituents of lower boiling point than zinc.

The principal part of the illustrated apparatus is a long vertical or columnar chamber 10 adapted, among other things, for the continuous partial vaporization and purification of a heavy corrosive liquid such as cadmium-containing molten zinc. Chamber 10 is surmounted by a head 12 and delivers liquid into a sump structure 14 at the bottom. It has heating chambers 16 and 18 at two opposite sides, as seen in Fig. 1, and supporting structures at the other two sides as seen in Fig. 2. The wall linings and internal structures of chamber 10, head 12 and sump 14 are all formed of highly refractory materials, such as the silicon carbide material known as Carborundum, which resist the high temperatures and the corrosiveness of molten zinc and substances present in or formed from it.

The head 12 has an intake 20 for a continuous inflow of molten zinc to be purified, which may be delivered through a refractory tube 21. Head 12 forms a vapor passageway 22 leading to an offtake 22a which is adapted to connect with another apparatus, such as a condenser, where vapors formed in chamber 10 may be further processed. Between intake 20 and the upper part of chamber 10 there may be one or more superimposed trays or weirs 23a, 23b and 23c over which the inflowing liquid passes to a distributing plate 24 and into the top of the vaporization space 15 of chamber 10. A baffle 25 dips into a pool on tray 23a to maintain a seal between the intake 20 and the vapor space of the apparatus. The vapors or gases rising through head 12 pass through the liquid films overflowing from tray to tray, as indicated by arrows in Fig. 2.

The interior space of chamber 10 is rectangular in horizontal cross section and is bordered by two pairs of spaced vertical side walls 30, 31 and 32, 33, respectively. The manner of constructing and supporting these side walls will be described more particularly hereinafter. For present purposes it suffices to state that they define and seal off from the external atmosphere a long columnar chamber space 15 which receives the molten zinc or other liquid from head 12, and which is largely filled by a multiplicity of refractory basin elements 35, 36, 37 and 38 that serve: (1) to distribute the inflowing liquid widely among many shallow pools and cascades, (2) to heat and vaporize or boil the liquid at many successive levels of the chamber space, and (3) to produce intimate contact or intimate scrubbing or stripping action between the liquids in the many pools and cascades and vapors or vapors and other gas rising in the chamber.

The many basin elements preferably are made of Carborundum, or the like, and as seen in the several figures they extend across space 15 between side walls 30 and 31 in spaced parallel relation and are arranged in tiers with the elements of adjacent tiers overlapping so that liquid overflowing the elements of one tier will fall to elements of the tier next below, and so that vapors or gases rising in the chamber must pass through spaces between the adjacent elements in intimate contact with the liquid. In the embodiment shown there are four forms of the refractory basin elements, as seen in Figs. 5, 6, 7 and 8, respectively. Those essential to the functioning of the apparatus are adapted to be heated internally, and to this end they preferably are made with a hollow or tubular form so as to be heated by gases circulated through their internal passages, these passages being isolated from the chamber space 15 by relatively thin refractory walls which are strong enough to sustain the loads imposed upon the individual basin elements but at the same time are thin enough to transfer heat with high efficiency.

Thus, Fig. 5 illustrates a tubular refractory basin element 35 which has an internal passage 35a for heating gases throughout its length and is one of many such elements adapted to extend across space 15 in parallel and spaced relation to each other and to the inner faces 32a and 33a of side walls 32 and 33; and Fig. 6 illustrates a tubular refractory basin element 36 which has an internal passage 36a for heating gases, and one of which is used in each heated tier of elements by extending across space 15 in parallel and spaced relation to elements 35 but with one side 36b sealed against the wall face 32a or 33a. To the extent permitted by the heating requirements of the apparatus, some of the basin elements may be unheated, or non-tubular. A symmetrical element of this type, which serves in other respects like the tubular elements 35, is shown at 37 in Fig. 7; while an asymmetrical or unheated element serving in other respects like elements 36, and having one side 38a to be sealed against wall face 32a or 33a, is shown at 38 in Fig. 8.

Each of the many basin elements forms a shallow basin 35c, 36c, 37c or 38c at its upper face.

Elements 35 and 37 are of full-width or symmetrical form and present liquid overflow rims or weirs along both sides of their respective basins, which may be provided with very shallow transverse overflow channels 35e and 37e, respectively, to assure good distribution of overflowing liquid. Elements 36 and 38 have half the width of the others, and since one side of each of these is sealed against wall face 32a or 33a, there is an overflow rim or weir only along the other side of each, which becomes the inner side in the assembled apparatus may be formed with very shallow transverse overflow channels 36e or 38e.

In addition, the opposite ends of each basin element are formed as mating or complementary refractory blocks 35d, 36d, 37d or 38d, which support the elements and the liquid on them across space 15, and which serve also as construction elements to build the chamber side walls 30 and 31. As seen in Figs. 2 and 4, the opposite side walls 30 and 31 are composed substantially entirely of stacks of these blocks, with only a suitable refractory mortar or sealing composition between the meeting edge faces of the blocks. By simply staggering the blocks of adjacent courses as they are laid, the corresponding basin elements of one course or tier are arranged to overlap and span horizontal spaces between the elements of the tier next below. Thus the basin elements are arranged in quincunx. As shown, there are two full width or symmetric elements and one half-width or asymmetric element in each tier, and these elements are tubular in all the tiers except those which lack access to heating gases.

It results that liquid entering the upper end of chamber space 15 from head 12 is collected in shallow pools by the basin elements in the first few tiers, which assure an even distribution of the inflowing liquid over the cross sectional area of the chamber, and as the inflow continues the liquid overflows in thin cascades into the basin elements of the successive tiers below. Most of these elements are heated, in the manner hereinafter described, to a high temperature sufficient to vaporize the liquids thereon. Vapors thus are formed in space 15 which must ascend through the spaces between the adjacent basin elements. As they rise they flow countercurrent to the overflowing liquid and over the surfaces of pools in the basins, in intimate scrubbing or stripping contact with the liquid.

Accordingly, as the feed liquid progresses downward in chamber 10 it passes through a succession of vaporizing and vapor-contact stages. Each of these stages removes some part of the lower-boiling material contained in the liquid at that stage; a zinc-cadmium vapor relatively rich in cadmium being vaporized from the pool of cadmium-contaminated molten zinc on each heated basin element. By appropriate selection of the number of tiers in the vaporization chamber a desired degree of purification or elimination of cadmium will have been produced when the descending metal reaches the bottom of the chamber, at which point purified zinc passes through outlet 41 in bottom plate 40 into the sump chamber 42 below.

Chamber 42 is kept sealed from the external atmosphere by a refractory baffle 43 dipping into the purified zinc. As the product accumulates it overflows beyond baffle 43 into a refractory offtake 44 which carries it to a suitable receptacle.

Heated and unheated basin elements can be distributed in any desired arrangements, in structures of the type here disclosed, so as to obtain desired degrees of equilibrium between liquids and vapors in the vaporization chamber.

If it is desired to supplement or substitute the scrubbing action of vapors formed in chamber 10 by action of other vapors or gases, the latter may be introduced into sump chamber 42 through a pipe 45, or otherwise, so as to rise through space 15 with the vapors formed therein.

The manner of heating the tubular basin elements is evident from Figs. 1 and 3. Their tubular passages 35a and 36a open through the side walls 30 and 31 formed by their block ends, into the opposite refractory heating gas chambers or fireboxes 16 and 18 at the outsides of those walls. The outer walls of chamber 16 may have a lateral extension 51 forming a firing chamber 53 for burners at 54. The hot gases produced at 53 escape only by flowing laterally across the vaporization chamber 10 through passages 35a and 36a of the tubular basin elements, thereby transferring heat through the surrounding walls of those elements to the many pools and streams of liquid inside chamber space 15. A refractory baffle or partition 55 divides chamber 16 into upper and lower sections 56 and 57, respectively, and a similar baffle or partition 58 divides chamber 18 into upper and lower sections 59 and 60, respectively. In the arrangement shown these baffles are placed so that the heating gases produced at 53 go first into section 56, thence across the upper portion of the vaporization chamber into section 59, thence across an intermediate portion of chamber 10 into section 57, and finally from section 57 through a lower group of tubular basin elements into section 60 from which the used heating gases escape through offtake 61. Depending upon the heating requirements, one or more additional burners 54 may be provided in any section of the heating chambers, there being one in each of chambers 57 and 59 as shown.

It will be understood that any desired route may be provided for the circulation of heating gases through the tubular basin elements, without limitation to the particular arrangement shown. If desired, firing may occur at the bottom of either heating chamber and the used heating gases may be taken off from the top.

It remains to describe the manner of supporting the side walls of the vaporization chamber in the desired sealed yet fully expansible relationship. The construction of walls 30 and 31 has been described. Walls 32 and 33 are formed as long thick bodies of refractory material faced by Carborundum bricks or the like at 32a and 33a. They extend over the full height of chamber 10, and they not only bridge the width of space 15 between side walls 30 and 31 but also overlap the longitudinal edges of the latter. See Fig. 3. Further, their own longitudinal edges have some lateral clearance from the adjacent walls of the heating chambers 16 and 18, so that the whole vaporization chamber stands unobstructed by the heating chambers with each side wall able to expand in every direction. The clearances at the lateral edges of walls 32 and 33 may be sealed to prevent escape of gases from the heating chambers by applying a suitable sealing substance at 80 in outside corners bordered by spaced angle members 81.

The four side walls are kept sealed together in that relationship by compressing walls 32 and 33 yieldably against the butting edges of the in-between walls 30 and 31. For this purpose suitable supporting means may be provided as follows: Along the outside wall 32 is a rigid framework including a bearing plate 70 resting against longitudinal beams 71 which are backed up by transverse beams 72. See Figs. 2 and 3. Along the outside of wall 33 there is a laterally movable support including a longitudinal bearing plate 70a which rests against longitudinal beams 71a; and heavy compression springs 75 are arranged at suitable points between the beams 71a and a rigid framework 74 spaced away from those beams. The outer ends of the springs bear against plates 76 which in turn are positioned adjustably with respect to framework 74 by means of screws 77 or the like.

In this way any desired sealing pressure between the butting edges of the chamber side walls can be obtained by suitable formation and setting of the springs 75, and the pressure can be so selected that the side walls always keep the chamber space 15 isolated from the external atmosphere yet are always able to expand and contract in any direction under the influence of temperature changes. For example, the basin elements forming walls 30 and 31 can expand longitudinally without obstruction and vertically against their own cumulative weight and horizontally against the force of the springs 75; and the embracing walls 32 and 33 possess similar kinds of freedom.

It will be evident that the disclosed manner of assembling and yieldably supporting refractory side walls of a columnar chamber adapted for use at high temperatures may be applied not only to a vaporization chamber comprising basin elements as hereinabove described, but also to vertical retorts or other vaporization columns as used, for example, in other phases of zinc metallurgy.

By an embodiment of the type here described and illustrated a molten zinc fed into inlet 20 with a cadmium content of about 0.5% to 5.0% can be so freed of cadmium that the purified zinc delivered from the sump chamber will contain not more than about .003% of cadmium.

The vaporization apparatus of this embodiment is particularly useful in the production of purified zinc.

It will be understood, however, that the new features of construction and operation here disclosed and claimed as our invention have various other uses and may be embodied in various forms or arrangements of apparatus within the scope of the appended claims.

We claim:

1. A high temperature vaporization apparatus comprising pairs of spaced parallel refractory walls forming a closed columnar chamber, the walls of one pair extending across the space between and overlapping longitudinal edges of the other walls, and supporting means for said walls including means yieldably compressing those of said one pair against the others so as to keep the sides of the chamber sealed yet readily expansible and contractable, said other walls being each formed of a multiplicity of polygonal transverse refractory blocks stacked together horizontally and vertically between the walls of said one pair, and refractory basin elements extending between said other walls in parallel and spaced and overlapping relation and forming shallow basins at their upper faces, the opposite blocks being integral supporting ends of the refractory basin elements, the vertical and longitudinal dimensions of the stacked blocks determining the spacing between the refractory basin elements.

2. A high temperature vaporization apparatus comprising pairs of spaced parallel refractory walls forming a closed columnar chamber, the walls of one pair extending across the space between and overlapping longitudinal edges of the other walls, and supporting means for said walls including means yieldably compressing those of said one pair against the others so as to keep the sides of the chamber sealed yet readily expansible and contractable, said other walls being each formed of a multiplicity of complementary refractory blocks stacked together horizontally and vertically between the walls of said one pair, refractory basin elements extending between said other walls in parallel and spaced and overlapping relation and forming shallow basins at their upper faces, the opposite blocks being integral supporting ends of said refractory basin elements, the vertical and horizontal dimensions of the stacked blocks determining the spacing between the refractory elements, at least some of said elements being tubular to provide internal passages for heating gases, and refractory heating gas chambers adjacent said other walls in communication with said passages through openings in the refractory blocks of the tubular elements.

FRANK G. BREYER.
ANDRE DELRUELLE.

References Cited in the file of this patent

UNITED STATES PATENTS

| Number | Name | Date |
|---|---|---|
| 902,535 | Johnson | Oct. 27, 1908 |
| 1,066,557 | Vialleix et al. | July 8, 1913 |
| 1,712,134 | Breyer et al. | May 7, 1929 |
| 1,822,755 | Smith et al. | Sept. 8, 1931 |
| 1,857,351 | Burhorn | May 10, 1932 |
| 1,918,245 | Bunce et al. | July 18, 1933 |
| 1,994,352 | Ginder et al. | Mar. 12, 1935 |
| 1,994,356 | Pierce et al. | Mar. 12, 1935 |
| 2,067,085 | Hawke | Jan. 5, 1937 |
| 2,267,698 | Janes | Dec. 23, 1941 |
| 2,330,143 | Pidgeon | Sept. 21, 1943 |